(12) United States Patent
Choi et al.

(10) Patent No.: US 10,956,622 B2
(45) Date of Patent: Mar. 23, 2021

(54) THERMAL HARDWARE-BASED DATA SECURITY DEVICE THAT PERMANENTLY ERASES DATA BY USING LOCAL HEAT GENERATION PHENOMENON AND METHOD THEREOF

(71) Applicant: Korea Advanced Institute of Science And Technology, Daejeon (KR)

(72) Inventors: Yang-Kyu Choi, Daejeon (KR); Jun-Young Park, Daejeon (KR)

(73) Assignee: KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 0 days.

(21) Appl. No.: 16/032,630

(22) Filed: Jul. 11, 2018

(65) Prior Publication Data

US 2019/0018986 A1    Jan. 17, 2019

(30) Foreign Application Priority Data

Jul. 12, 2017   (KR) ........................ 10-2017-0088372
Feb. 13, 2018   (KR) ........................ 10-2018-0018003

(51) Int. Cl.
*G06F 21/79*       (2013.01)
*G11C 13/00*       (2006.01)
(Continued)

(52) U.S. Cl.
CPC ............... *G06F 21/79* (2013.01); *G11C 7/04* (2013.01); *G11C 11/1675* (2013.01);
(Continued)

(58) Field of Classification Search
None
See application file for complete search history.

(56) References Cited

U.S. PATENT DOCUMENTS

2006/0246643 A1\* 11/2006 Ohsawa .............. H01L 51/0035
                                                        438/197
2009/0109729 A1\*  4/2009 Toda .................. G11C 13/0097
                                                        365/148
(Continued)

FOREIGN PATENT DOCUMENTS

KR       100903552 B1      6/2009
KR       20140107621 A     9/2014
KR       101532701 B1      7/2015

OTHER PUBLICATIONS

Ki-Hyun Ahn, "The Memory Semiconductor Trend of Technology and Action," Vacuum Magazine, 2016, 4 pages.
(Continued)

*Primary Examiner* — Kevin Verbrugge
(74) *Attorney, Agent, or Firm* — Foley & Lardner LLP

(57) ABSTRACT

The present invention provides a thermal hardware-based data security device that is capable of physically, hardware-wise, and permanently erasing data stored in a memory and of enabling a storage device to be reused, and a method thereof. The thermal hardware-based data security device includes: a memory chip capable of storing data; a heater module which supplies heat to permanently erase the data stored in a memory cell within the memory chip; and a switch module which short-circuits the heater module between a power supply unit and a ground when switched on, and thus, controls the heater module to be operated.

15 Claims, 11 Drawing Sheets

(51) Int. Cl.
*G11C 16/34* (2006.01)
*H05B 3/00* (2006.01)
*G11C 16/22* (2006.01)
*G11C 16/30* (2006.01)
*G11C 11/16* (2006.01)
*G11C 16/14* (2006.01)
*G11C 7/04* (2006.01)
*G11C 16/10* (2006.01)
*H05B 3/26* (2006.01)
*H01L 23/34* (2006.01)

(52) U.S. Cl.
CPC ...... *G11C 11/1695* (2013.01); *G11C 11/1697* (2013.01); *G11C 13/0002* (2013.01); *G11C 13/0004* (2013.01); *G11C 13/0016* (2013.01); *G11C 13/0038* (2013.01); *G11C 13/0059* (2013.01); *G11C 13/0069* (2013.01); *G11C 13/0097* (2013.01); *G11C 16/10* (2013.01); *G11C 16/14* (2013.01); *G11C 16/22* (2013.01); *G11C 16/30* (2013.01); *G11C 16/3445* (2013.01); *H05B 3/00* (2013.01); *H05B 3/26* (2013.01); *G06F 2221/2143* (2013.01); *G11C 2013/008* (2013.01); *H01L 23/345* (2013.01)

(56) References Cited

U.S. PATENT DOCUMENTS

| | | | |
|---|---|---|---|
| 2010/0188892 A1* | 7/2010 | Baks | H01L 45/06 365/163 |
| 2012/0230118 A1* | 9/2012 | Babcock | H01L 27/11521 365/185.29 |
| 2013/0148437 A1* | 6/2013 | Bronner | G11C 13/0035 365/185.29 |
| 2013/0227268 A1* | 8/2013 | Ichida | G06F 9/448 713/100 |
| 2014/0050021 A1* | 2/2014 | Kim | G11C 13/0069 365/163 |
| 2016/0379713 A1* | 12/2016 | Arigane | G11C 16/0466 365/185.29 |
| 2017/0229173 A1* | 8/2017 | BrightSky | G11C 13/0059 |
| 2018/0060230 A1* | 3/2018 | Kankani | G06F 12/0246 |

OTHER PUBLICATIONS

Office Action dated May 13, 2019 in related Korean Application No. 10-2018-0018003, with English translation.

* cited by examiner

| 206 |
|---|

| E0 | E0 | E0 | E0 | E0 | E0 | E0 | E0 | - | E0 | E0 | E0 | E0 | E0 | E0 | E0 | E0 |
|---|---|---|---|---|---|---|---|---|---|---|---|---|---|---|---|---|
| E0 | E0 | E0 | E0 | E0 | E0 | E0 | E0 | - | E0 | E0 | E0 | E0 | E0 | E0 | E0 | E0 |
| E0 | E0 | E0 | E0 | E0 | E0 | E0 | E0 | - | E0 | E0 | E0 | E0 | E0 | E0 | E0 | E0 |
| E0 | E0 | E0 | E0 | E0 | E0 | E0 | E0 | - | E0 | E0 | E0 | E0 | E0 | E0 | E0 | E0 |
| E0 | E0 | E0 | E0 | E0 | E0 | E0 | E0 | - | E0 | E0 | E0 | E0 | E0 | E0 | E0 | E0 |
| E0 | E0 | E0 | E0 | E0 | E0 | E0 | E0 | - | E0 | E0 | E0 | E0 | E0 | E0 | E0 | E0 |
| E0 | E0 | E0 | E0 | E0 | E0 | E0 | E0 | - | E0 | E0 | E0 | E0 | E0 | E0 | E0 | E0 |
| E0 | E0 | E0 | E0 | E0 | E0 | E0 | E0 | - | E0 | E0 | E0 | E0 | E0 | E0 | E0 | E0 |
| E0 | E0 | E0 | E0 | E0 | E0 | E0 | E0 | - | E0 | E0 | E0 | E0 | E0 | E0 | E0 | E0 |
| E0 | E0 | E0 | E0 | E0 | E0 | E0 | E0 | - | E0 | E0 | E0 | E0 | E0 | E0 | E0 | E0 |
| E0 | E0 | E0 | E0 | E0 | E0 | E0 | E0 | - | E0 | E0 | E0 | E0 | E0 | E0 | E0 | E0 |
| E0 | E0 | E0 | E0 | E0 | E0 | E0 | E0 | - | E0 | E0 | E0 | E0 | E0 | E0 | E0 | E0 |
| E0 | E0 | E0 | E0 | E0 | E0 | E0 | E0 | - | E0 | E0 | E0 | E0 | E0 | E0 | E0 | E0 |
| E0 | E0 | E0 | E0 | E0 | E0 | E0 | E0 | - | E0 | E0 | E0 | E0 | E0 | E0 | E0 | E0 |
| E0 | E0 | E0 | E0 | E0 | E0 | E0 | E0 | - | E0 | E0 | E0 | E0 | E0 | E0 | E0 | E0 |

THERMAL HARDWARE-BASED DATA SECURITY DEVICE THAT PERMANENTLY ERASES DATA BY USING LOCAL HEAT GENERATION PHENOMENON AND METHOD THEREOF

CROSS-REFERENCE TO RELATED APPLICATIONS

This application claims priority to South Korean Application No. 10-2017-0088372, filed Jul. 12, 2017; and South Korean Application No. 10-2018-0018003, filed Feb. 13, 2018; the disclosures of both of which are incorporated by reference herein in their entirety.

BACKGROUND

Field

The present disclosure relates to a thermal hardware-based data security device that can be applied to a security-enhanced flash memory (SSD, USB, SD memory, etc.), and a method thereof, and more particularly to a thermal hardware-based data security device that is capable of permanently erasing data and of enabling a storage device to be reused, by using a heater module and a switch module that are attached separately within a flash memory product, and a method thereof.

Description of the Related Art

With the development of information technologies, the amount of data that is stored in a storage device is explosively increasing. In the past, data storage has been made by using a hard disk drive (HDD) to which the principle of magnetic alignment and magnetic field are applied. However, the hard disk drive is currently limitedly used in a high-capacity server because the hard disk drive has a large volume due to mechanical parts such as an actuator, a header, etc., is vulnerable to external impact, and has a low data processing speed.

Meanwhile, a flash memory (SSD, USB, SD memory, etc.) has a small volume, and thus, can be integrated with a high capacity. For this reason, the flash memory is used as an internal storage device of most mobile devices and digital devices. The manufacturing cost of the flash memory is steadily decreasing, so that the flash memory is also being introduced into the large-capacity server.

As the amount of data to be stored is explosively increasing, information having a strong influence on state, society, and economy, such as personal information, military information, medical information, confidential information on the state and enterprises, financial information, etc., is stored in the storage device. This trend is confirmed by the introduction of Internet of Things. In such an environment, data leakage causes personal privacy disclosure from a small point of view and to determine the rise and fall of the state and enterprise from a big point of view. Therefore, attention is paid to a method of permanently erasing the data stored in the storage device.

In general, it is not true that data is permanently erased when a user proceeds to delete the stored data in an operating system (OS). This is because the deletion performed in the operating system does not mean physically and hardware-wise erasing of the data stored in hardware (HDD or cell of the flash memory) but means software-wise erasing of an address (or pointer), which notifies that a space for storing data can be allocated. Also, regarding the software-wise erasing, the data security is very vulnerable because the data can be easily recovered by using separate recovery software.

A physically and hardware-wise erasing method has been proposed to overcome the above problems. In an HDD storage device, Degaussing method of destroying magnetism by applying a high magnetic field is representative. The HDD destroyed in this way cannot be permanently recovered and reused.

However, as described above, most storage devices are already being replaced with the flash memory, and the proportion thereof is now increasing. Overwrite method is a representative, which permanently erases the data of the flash memory. The principle of the overwrite method is to overwrite the originally stored data by repeating a process of writing meaningless data called dummy data to all the cells of the flash memory and erasing it.

Strictly speaking, this method is based on physically and hardware-wise writing rather than on physically and hardware-wise erasing. Therefore, due to intentionally repeated writing and erasing of dummy data, the originally physically and hardware-wise stored data is covered by the overwritten dummy data and thus, cannot be permanently recovered. Here, if an attempt is made to recover the data by using recovery software, the recovery software can only recover the dummy data. Unlike the Degaussing method in the description of the HDD, the overwrite method has an advantage of enabling the flash memory to be reused.

However, with the increase of the degree of integration of the flash memory, the permanent erase of data by using the overwrite method is not effective any more. This is because the overwrite method requires dummy data the size of which is equal to the capacity of the flash memory during the process of writing and erasing the data. In consideration of the fact that the capacity of the flash memory is increasing, a large amount of time is required to permanently erase the data by using the overwrite method. Therefore, this method is not practical any longer. Additionally, the overwrite method repeats writing and erasing for all the cells, and thus, promotes the electrical aging applied to the cell. Accordingly, the lifetime of the flash memory is fatally deteriorated.

SUMMARY

One embodiment is a thermal hardware-based data security device including: a memory chip capable of storing data; a heater module which supplies heat to permanently erase the data stored in a memory cell within the memory chip; and a switch module which short-circuits the heater module between a power supply unit and a ground when switched on, and thus, controls the heater module to be operated.

The thermal hardware-based data security device may further include a data erasing device which supplies voltage or current to the heater module and permanently erases the data stored in the memory cell.

The thermal hardware-based data security device may further include a first wiring line which electrically connects the power supply unit and the heater module or the switch module, and a second wiring line which electrically connects the ground and the heater module or the switch module.

The memory chip may be a flash memory chip which includes a solid-state drive (SSD), a universal serial bus (USB), a secure digital (SD) card, and a transistor such as a floating gate transistor, or a charge trap layer transistor.

The memory chip may be included in a phase change memory (PcRAM), a resistive switching random access memory (RRAM), a magnetic random access memory (MRAM), or a polymer random access memory (PoRAM).

The data erasing device may include a power supply module which supplies power to the memory chip, and a timer module capable of controlling a time period for supplying a power provided to the memory chip.

The heater module may be formed of passive elements, or is formed of metal, inorganic materials, organic materials, ceramic materials, or polymer materials, and may have a heat generation characteristic due to the input of an electrical signal.

The heater module may have a heat generation characteristic due to microwaves, ultrasonic waves, heat, radio waves, electromagnetic waves, laser, ultraviolet rays, gas, liquid, vibration which are applied externally, wireless signals supplied from a wireless power transmission device, or a magnetic field.

The passive element may be one of a carbon film resistor, a solid resistor, a metal film resistor, a metal oxide film resistor, a metal glaze resistor, a fuse type resistor, a coil-type resistor, a coil-type non-inductive resistor, a cement resistor, a metal clad resistor, a ceramic resistor, a chip resistor, a network resistor, and a variable resistor.

The heater module may be formed of a metallic material including a nichrome wire or tungsten or is formed of a thermoelectric device or a positive temperature coefficient (PTC) thermistor.

The memory chip, the heater module, and the switch module may be configured in the form of System On Chip.

The data erasing device may include a connection port which connects a plurality of the memory chips to each other to permanently erase the data stored in the plurality of memory chips.

Another embodiment is a thermal hardware-based security method including: providing a memory chip including a memory cell in which data has been stored; and providing heat, through a heater module, to permanently erase the data stored in the memory cell. The providing heat includes controlling the heater module to be operated by short-circuiting the heater module between a power supply unit and a ground when a switch module is switched on.

The providing heat may include erasing permanently, through a data erasing device, the data stored in the memory cell by supplying voltage or current to the heater module.

Other details of the present invention are included in the description and drawings of the present invention.

BRIEF DESCRIPTION OF THE DRAWINGS

FIGS. 6a to 6c show verification data which proves that the data of the flash memory of a product has been permanently erased by the embodiments of the present invention and cannot be recovered by commercial software; and FIG. 7 is a view schematically showing the structure of a security flash memory according to another embodiment of the present invention.

DETAILED DESCRIPTION

Figure 1A:
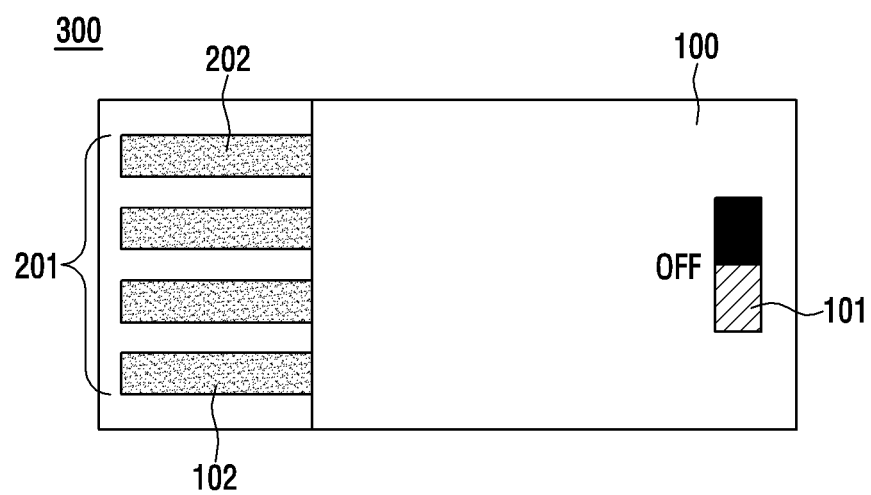
FIGS. 1a to 1d are views showing a flash memory (USB) according to an embodiment of the present invention.

The features, advantages and method for accomplishment of the present invention will be more apparent from referring to the following detailed embodiments described as well as the accompanying drawings. However, the present invention is not limited to the embodiment to be disclosed below and is implemented in different and various forms. The embodiments bring about the complete disclosure of the present invention and are only provided to make those skilled in the art fully understand the scope of the present invention. The present invention is just defined by the scope of the appended claims.

Terms used in the present specification are provided for description of only specific embodiments of the present invention, and not intended to be limiting. In the present specification, an expression of a singular form includes the expression of plural form thereof if not specifically stated. The terms "comprises" and/or "comprising" used in the specification is intended to specify characteristics, numbers, steps, operations, components, parts or any combination thereof which are mentioned in the specification, and intended not to exclude the existence or addition of at least one another characteristics, numbers, steps, operations, components, parts or any combination thereof.

Unless differently defined, all terms used herein including technical and scientific terms have the same meaning as commonly understood by one of ordinary skill in the art to which the present invention belongs. Also, commonly used terms defined in the dictionary should not be ideally or excessively construed as long as the terms are not clearly and specifically defined in the present application.

It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions, placements, or configurations of individual components within each disclosed embodiment may be changed without departing from the spirit and scope of the present invention.

Hereinafter, embodiments in accordance with the present invention will be described with reference to the accompanying drawings. The preferred embodiments are provided so that those skilled in the art can sufficiently understand the present invention, but can be modified in various forms and the scope of the present invention is not limited to the preferred embodiments.

In a thermal hardware-based data security device and method according to the embodiment of the present invention, physically and hardware-wise erasing of stored data is implemented by applying local heat to a memory chip. Particularly, the physically and hardware-wise erasing of the data stored in the memory chip is implemented by supplying heat energy to the memory chip through a heater module 104.

Here, a memory finished product may include a flash memory including a transistor such as a solid-state drive (SSD), a universal serial bus (USB), a secure digital (SD) card, and a floating gate transistor, a charge trap layer transistor, or the like. Particularly, the memory finished product may be another kind of a memory that uses the SSD, USB, SD, floating gate transistor, charge trap layer transistor, etc., as a memory cell.

For example, the memory finished product may include a phase change memory (PcRAM), a resistive switching random access memory (RRAM), a magnetic random access memory (MRAM), or a polymer random access memory (PoRAM).

FIGS. 1*a* to 1*d* are views showing the flash memory (USB) according to the embodiment of the present invention. FIG. 2 is a view showing the flash memory (SSD) according to another embodiment of the present invention.

The thermal hardware-based data security device according to the embodiment of the present invention uses the heater module 104 included in the memory chip like the flash memory, etc., and implements the physically and hardware-wise erasing of the data stored in a memory cell 206 not only in an electrical manner but also by a heat generation phenomenon. Here, the flash memory may be not only the SSD storage device, USB storage device, and SD card, but also another kind of memory including the memory cell 206 based on a transistor such as the floating gate transistor or charge trap layer transistor.

Figure 1B:
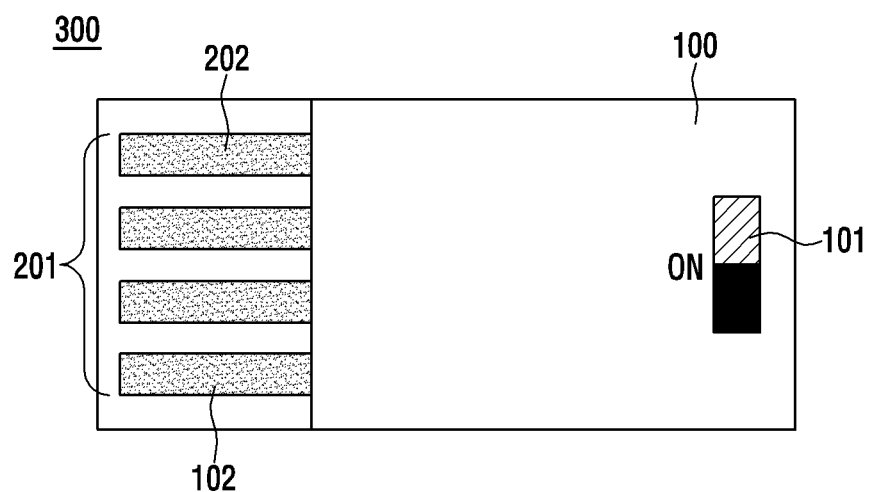
Figure 2:
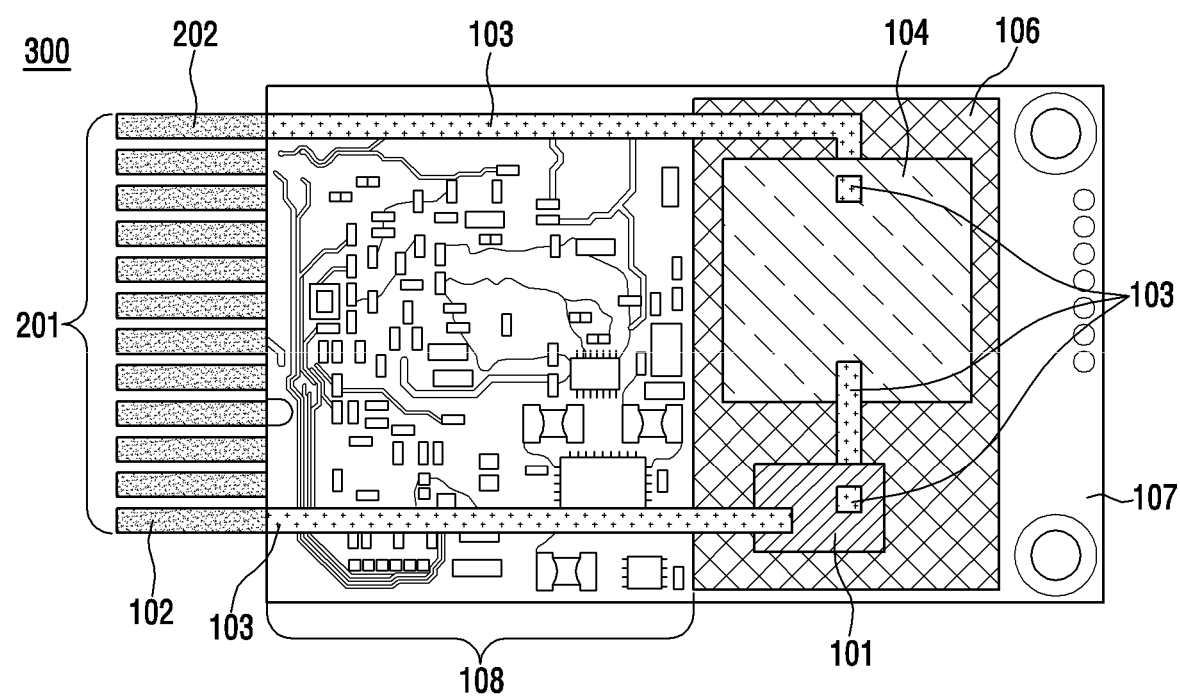
FIG. 2 is a view showing a flash memory (SSD) according to another embodiment of the present invention.

First, referring to FIGS. 1*a* and 1*b*, through the operation of a switch module 101 outside a security memory 300, a security operation mode (on-state of the switch module) and a normal operation mode (off-state of the switch module) can be selected. In the normal operation mode, the electrical connection between the ground 202 and a power supply unit 102 of the memory is opened and thus the heater module 104 does not operate, so that the transmission, storage, and deletion of the data can be normally performed. When the security memory is connected to a data erasing device 203 after the security operation mode is set through the operation of the switch module 101, the electrical connection between the ground 202 and the power supply unit 102 of the memory is short-circuited, and thus the heater module 104 operates and a heat generation phenomenon occurs to a memory chip 106. Here, the power supply unit 102 and the ground 202 constitute a part of a memory input/output terminal 201.

The memory chip 160 is generally protected by epoxy molding compound which has durability against a temperature of about 400° C. Therefore, the operating temperature of the heater module 104 is suitably about 400° C. or less.

Figure 1C:
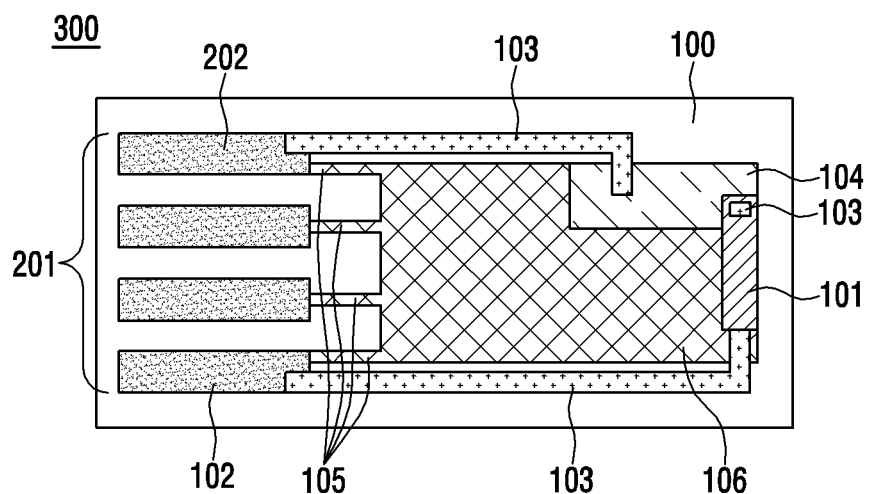

The heater module 104 can be, as shown in FIG. 1*c*, positioned to occupy a portion of the memory chip 106 within a memory case 100. Further, for the purpose of increasing the efficiency of the present invention, the area of the heater module 104 can be similar to, equal to, or greater than that of the memory chip 106.

Figure 1D:
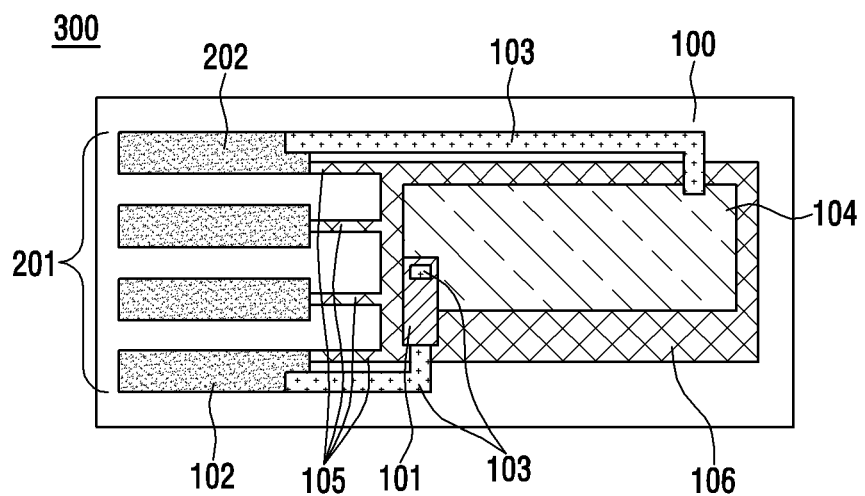

Here, although FIGS. 1*c* and 1*d* show, for convenience, one memory chip 106, a plurality of memory chips 106 can be provided according to the type and capacity of the memory. As shown in FIGS. 1*c* and 1*d*, a memory internal wiring 105 connects the memory chip 106 and other parts within the security memory 300. For example, the memory internal wiring 105 may connect the memory chip 106 and the power supply unit 102 or may connect the memory chip 106 and the ground 202.

For making it easier to understand the present invention, FIGS. 1*a* to 1*d* has taken an example of the USB type flash memory. Further, the SSD type flash memory can be also applied as shown in FIG. 2 in the same principle. However, there is a major difference in that other parts 108 for driving the SSD are generally placed on a substrate 107 in the SSD type flash memory.

Figure 3:
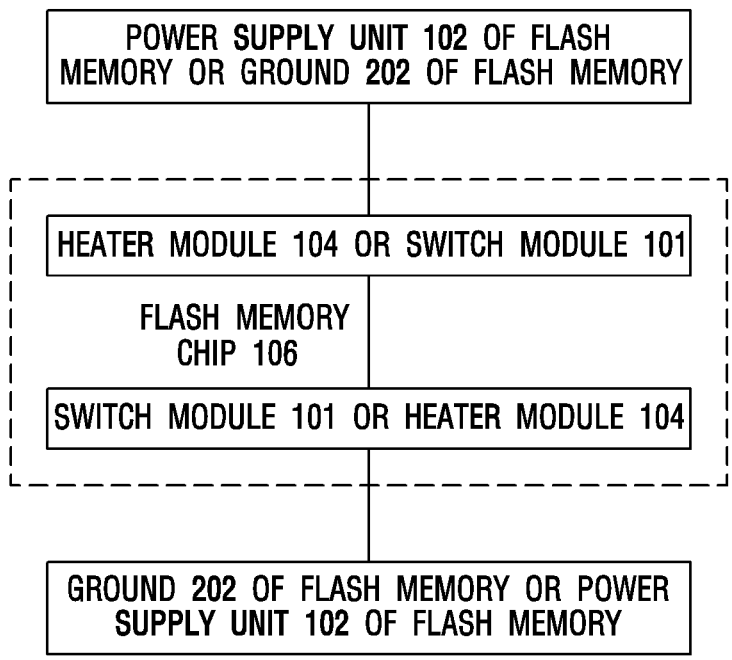
FIG. 3 is a block diagram showing a circuit connection state of various types of flash memories (SSD, USB, SD memory) according to the embodiment of the present invention.

FIG. 3 is a block diagram showing a circuit connection state of various types of the flash memories (SSD, USB, SD memory) according to the embodiment of the present invention.

FIG. 3 is a block diagram showing the structure and connection of the flash memory according to the embodiments of the present invention. FIG. 3 shows that the generated heat is transferred to the memory chip 106 through the operation of the switch module 101 and the heater module 104 located between the ground 202 and the power supply unit 102 of the flash memory.

For example, the security memory 300 may include a first wiring line which electrically connects the power supply unit 102 and the heater module 104 or the switch module 101, and a second wiring line which electrically connects the ground 202 and the heater module 104 or the switch module 101.

Specifically, according to the embodiment, the power supply unit 102 of the flash memory may be connected to the heater module 104, and the ground 202 of the flash memory may be connected to the switch module 101. According to another embodiment, the power supply unit 102 of the flash memory may be connected to the switch module 101, and the ground 202 of the flash memory may be connected to the heater module 104.

FIGS. 4*a* to 4*d* are views showing the data erasing device for erasing physically, hardware-wise, and permanently various types of data of the flash memories (SSD, USB, SD memory) according to the embodiments of the present invention.

Figure 4A:
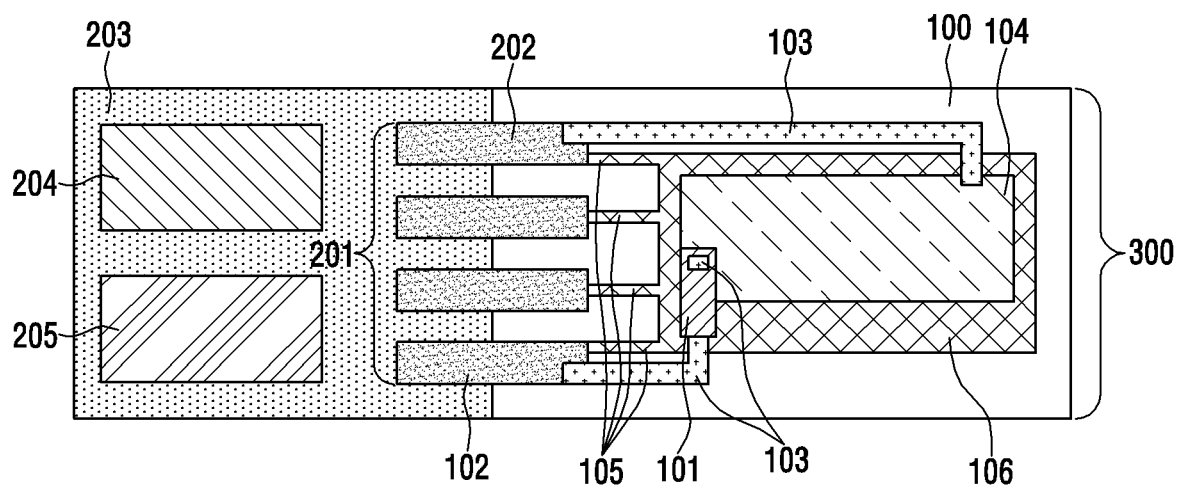
FIGS. 4a to 4d are views showing a data erasing device for erasing physically, hardware-wise, and permanently various types of data of flash memories (SSD, USB, SD memory) according to the embodiments of the present invention.
Figure 4B:
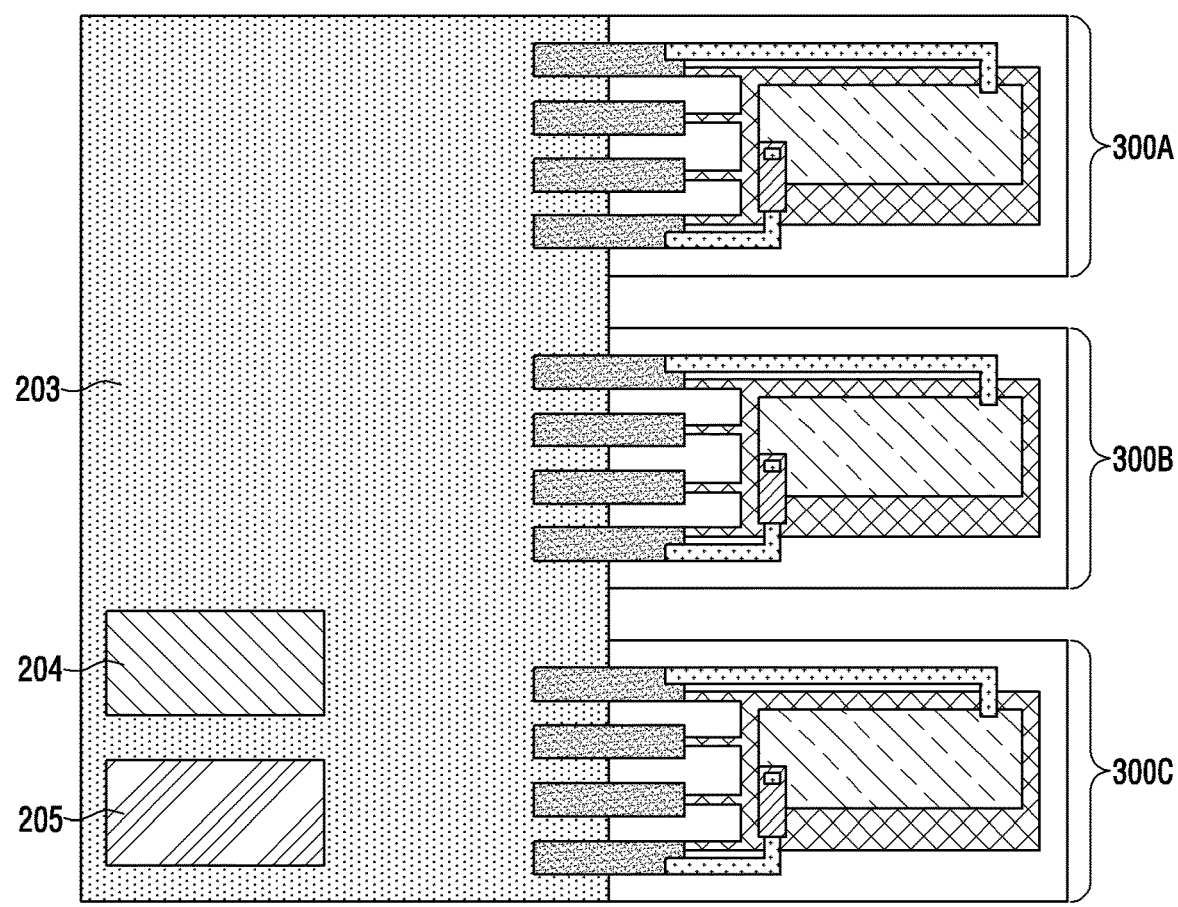
Figure 4C:
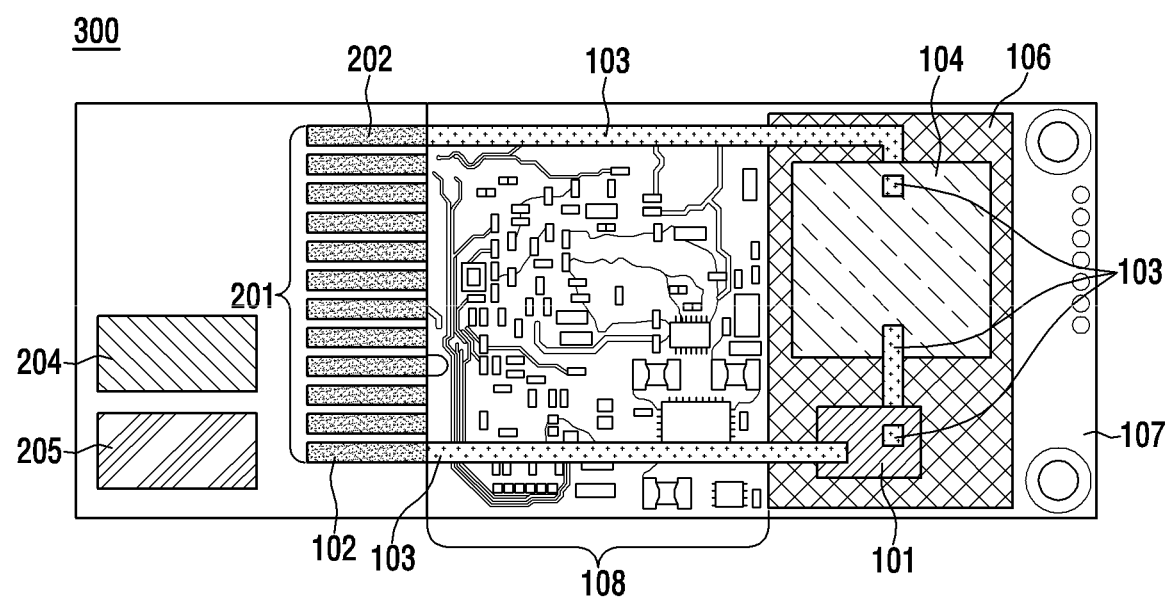
Figure 4D:
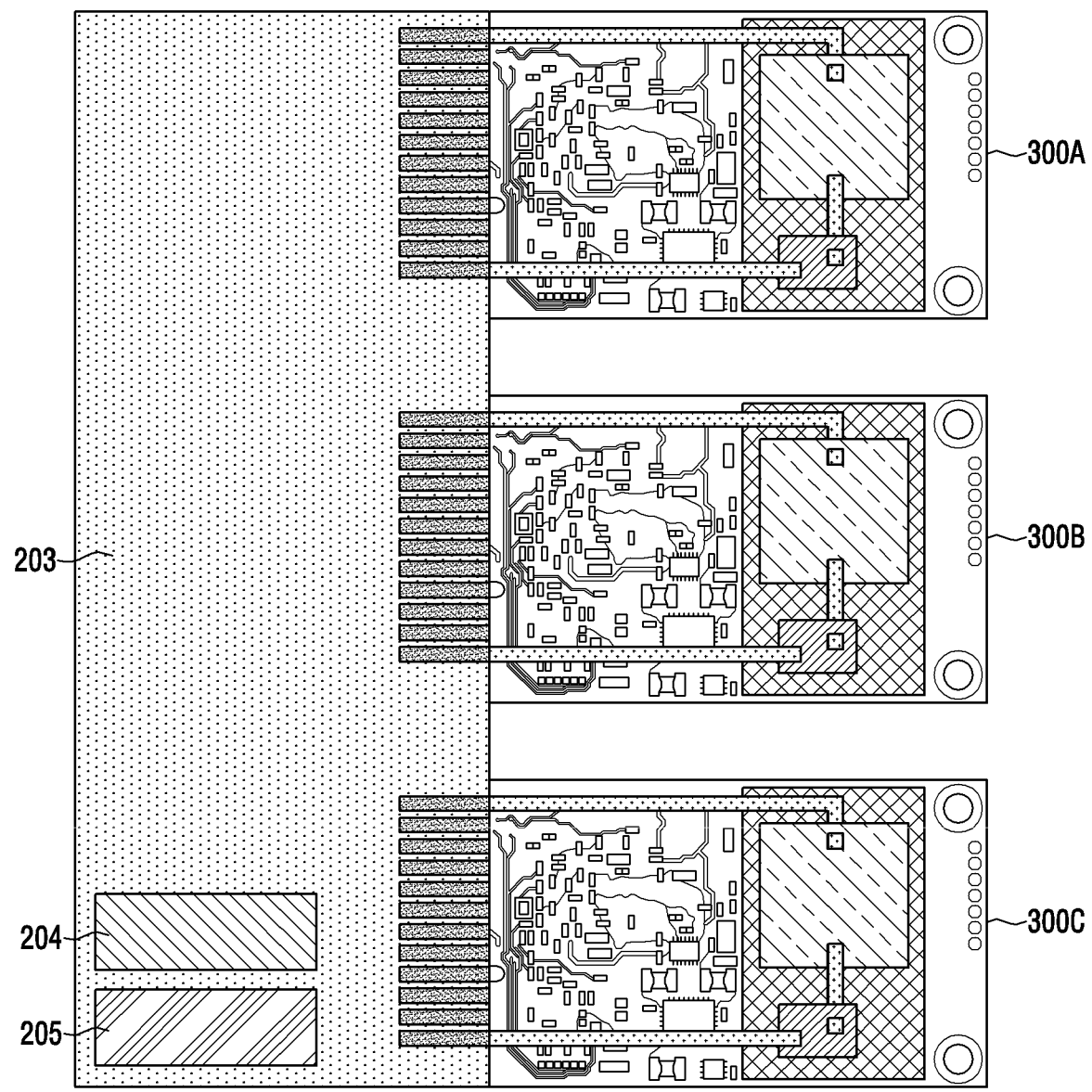

FIGS. 4*a* to 4*d* are views showing the data erasing device 203 for erasing physically, hardware-wise, and permanently the data stored in the memory cell 206 of the security memory 300 according to the embodiments of the present invention. Specifically, as with FIG. 1*d*, FIGS. 4*a* and 4*b* show the embodiment where the security flash memory 300 of the present invention is a USB. As with FIG. 2, FIGS. 4*c* and 4*d* show the embodiment where the security flash memory 300 of the present invention is a SSD.

According to the embodiment, the data erasing device 203 may include functions of a PC, a laptop computer, and a smartphone.

The data erasing device 203 serves to supply voltage or current for generating the heating phenomenon to the security memory 300. Here, the data erasing device 203 may include a power supply module 204 or a separate battery. Also, the data erasing device 203 may include a timer module 205, thereby controlling a time period for supplying the voltage or current to the security memory 300.

The data erasing device 203 may include a determination unit (not shown) for determining by the operation of the heater module 104 in a switching-on state whether the data stored in the memory cell 206 is erased or not.

For example, after a heat treatment process is performed by power (5V) supplied by the power supply module 204, time period set (10 minutes) by the timer module 205, and the switch module 101 (on-state), the data erasing device 203 can check through the determination unit whether the data stored in the memory cell 206 is erased or not.

Also, the data erasing device 203 can additionally perform an overwrite method for reliably erasing the data on the memory cell 206. That is, a process of first erasing the data thermally and then of newly overwriting and erasing dummy data in the memory cell 206 in a software manner is additionally performed, so that the data can be completely erased. This is because the data can be more completely erased by additionally using the overwrite method in addition to the method for thermally erasing the data. This overwrite method can be generally repeated about 3 to 35 times in accordance with the security level of information.

The data erasing device 203 may include a display (not shown) for displaying the result of the determination, by the determination unit, of whether or not the data stored in the memory cell 206 is erased.

Also, as shown in FIGS. 4b and 4d, the data erasing device 203 can erase physically, hardware-wise, and permanently the stored data for a plurality of the security memories 300 at the same time and at a time.

According to another embodiment, the data erasing device 203 can erase the data of the plurality of security memories 300A, 300B, and 300C independently and respectively.

Specifically, when the plurality of security memories 300A, 300B, and 300C are not mounted at the same time, the timer module 205 can control the time period for applying heat to each of the plurality of security memories 300A, 300B, and 300C independently. For example, at the moment when the security memory 300A of FIG. 4b is connected to the data erasing device 203, the timer module 205 sets a heat treatment time for only the security memory 300A as "A" minutes. After "A" minutes, the power supply may be automatically stopped. However, when the security memory 300B is additionally mounted in less than "A" minutes, the power is still supplied to the security memory 300A for the remaining time, and simultaneously with this, the timer module 205 sets the heat treatment time for only the security memory 300B as "B" minutes and the power may be supplied to the security memory 300B following this. Here, the "A" minutes and "B" minutes may be equal or not equal to each other because speeds and ratios at which the data is thermally erased may be different for each manufacturer that manufactures the security memory 300.

Figure 5:
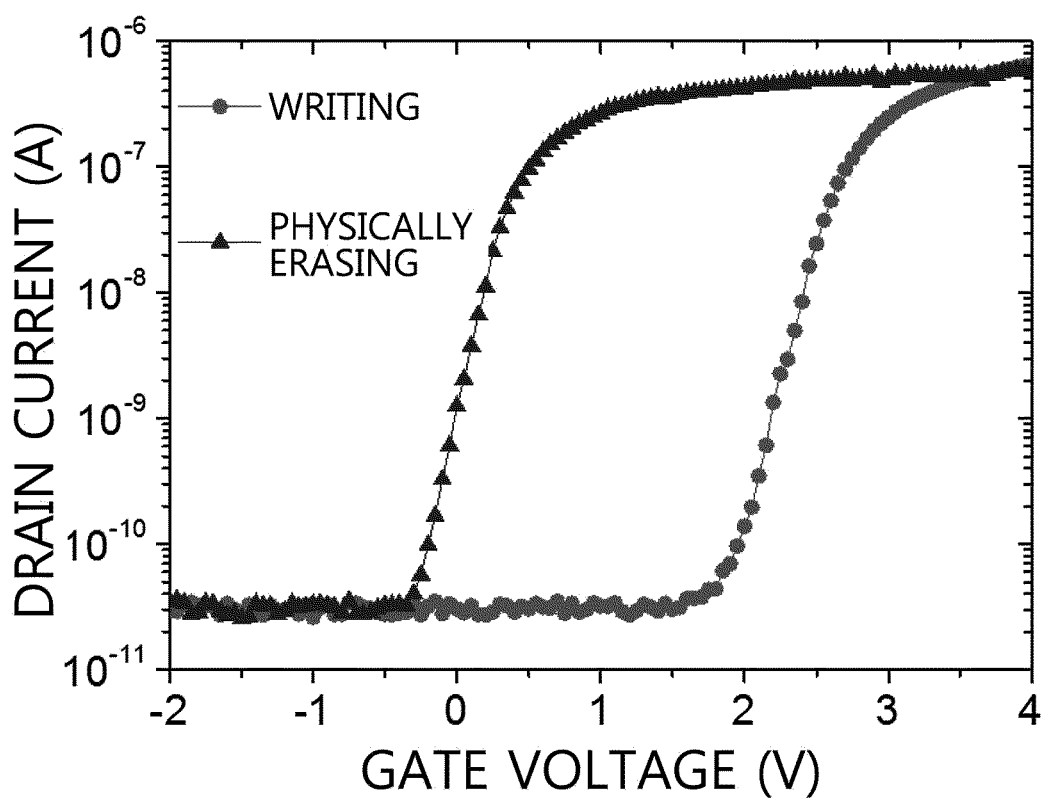
FIG. 5 shows actually measured data through an experiment in which the data stored in memory cell in the flash memory can be permanently erased by the embodiments of the present invention.
Figure 6A:
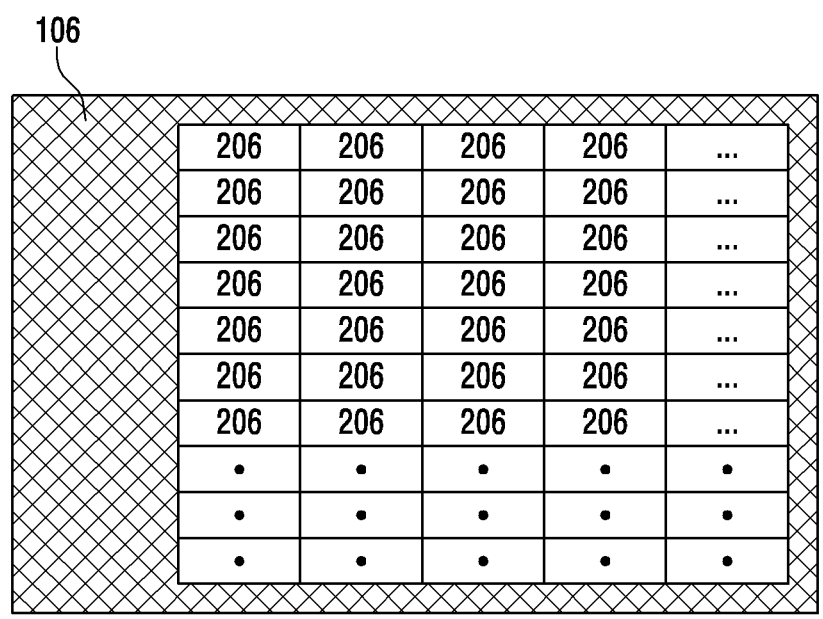
Figure 6B:
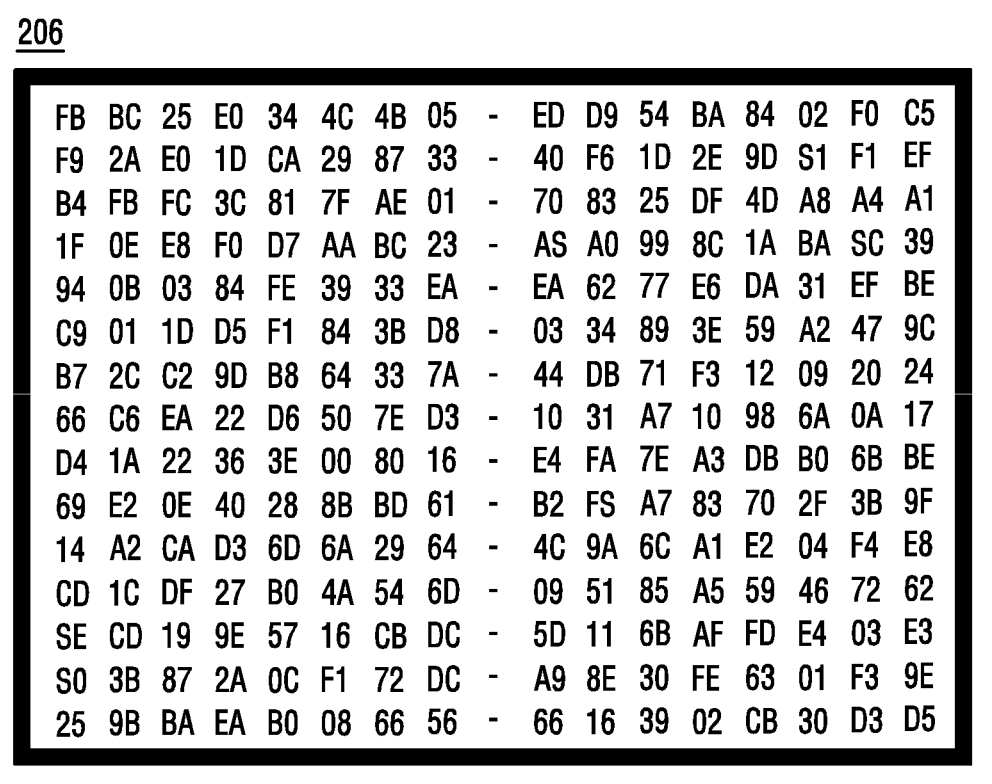
Figures 6C, 7:
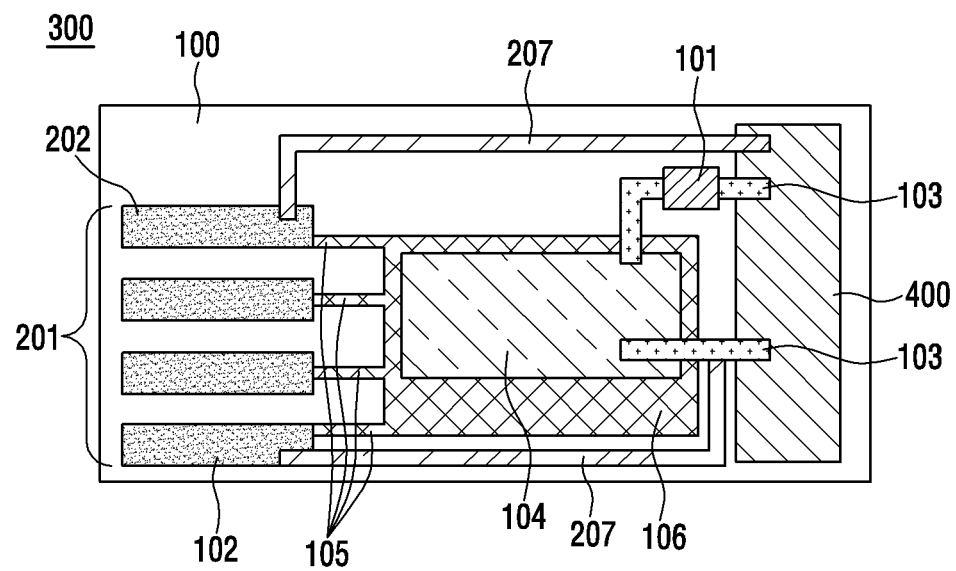

FIG. 5 shows actually measured data through an experiment in which the data stored in memory cell in the flash memory can be permanently erased by the embodiments of the present invention. FIGS. 6a to 6c show verification data which proves that the data of the flash memory of a product has been permanently erased by the embodiments of the present invention and cannot be recovered by commercial software.

FIG. 5 shows an experimental data showing that the data stored in memory cell 206 is permanently erased by the embodiments of the present invention. The memory chip 106 is an integrated body composed of numerous memory cells 206. It can be found through FIG. 5 that the data stored in the memory cell 206 is physically, hardware-wise and permanently erased effectively by the heat generated by the heater module 104.

In general, in the flash memory cell, the data is written mainly by the voltage application and erased by an electric field. Further, the data is also erased by the thermal fluctuation of stored carrier (electron) caused by applying high temperature heat to the memory cell 206. The present invention is based on this thermal erase method.

FIG. 6 shows a result data of an experiment performed in order to verify that the data of the commercially used memory chip 106 instead of one memory cell 206 of FIG. 5 is physically, hardware-wise, and permanently erased. Regarding the data stored in the cell, the memory chip 106 stores, as shown in FIG. 6b, 16-bit, 32-bit or 64-bit data composed of numbers and alphabets, in the memory cell 206.

However, as shown in FIG. 6c, it can be found that the data stored in the memory cell 206 within the memory chip 106 exposed to a high temperature has been physically, hardware-wise, and permanently erased and replaced with "E0".

This is verification data which proves that the data cannot be recovered even by commercial software. This verification has been also confirmed by companies that support data recovery.

FIG. 7 is a view schematically showing the structure of the security flash memory according to another embodiment of the present invention.

Referring to FIG. 7, the structure of the security memory 300 is schematically shown. The data erasing device 203 can be embedded as a battery module 400 within the security memory 300. The data erasing device 203 of FIG. 7 can be implemented in the same manner as or in a similar manner to the above-described data erasing device 203 of FIG. 4. When the switch module 101 is in the normal operation mode (off-state of the switch module), a wiring 103 between the heater module 104 and the battery module 400 is open and the heater module 104 hereby does not operate. As a result, the transmission, storage, and deletion of the data can be normally performed. Simultaneously with this, the power supply unit 102 of the flash memory and the ground 202 are connected to a battery module wiring 207, so that the battery module 400 can be charged for the use time. Here, not only battery cells but also additional circuits such as a charging and discharging circuit, a timer, etc., may be embedded within the battery module 400.

When the security operation mode is set through the operation of the switch module 101, the battery module 400 and the wiring 103 are short-circuited, so that the heater module 104 operates and a heat generation phenomenon occurs to the memory chip 106. Here, the energy of the battery module 400 charged in the normal operation mode is consumed.

According to the embodiment, the switch module 101 can be implemented as a timer switch having a timer function. When the switch module 101 is implemented as a timer switch, it is possible to control the data erasing time and/or the amount of data to be erased.

For example, the timer switch can be implemented as a switch which is automatically turned off with the lapse of time. That is, the timer switch is automatically turned off with the lapse of a predetermined time, so that the data erasure can be stopped or completed. Alternatively, the operation time of the timer switch can be controlled at the upper, middle, and lower levels so as to control the heat treatment time. For example, the operation time of the timer switch can be controlled such that the data is completely erased in 10 minutes at the upper level and only 50% of the data is erased in five minutes at the middle level.

Besides, in order to maximize the temperature of the heater module 104, an insulating layer (not shown) may be additionally disposed on the heater module 104. When the insulating layer is disposed on the heater module 104, the temperature can be further increased under the same conditions.

In addition, according to the embodiment of the present invention, it is also possible to enhance the security of the memory chip 160 by using a method for programming random numbers software-wise in the memory cell 206, by adding a format process, or by the overwrite method.

The features, structures and effects and the like described in the embodiments are included in one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A thermal hardware-based data security device comprising:
   a memory chip capable of storing data;
   a heater module which supplies heat to permanently erase the data stored in a memory cell within the memory chip;
   a switch module which short-circuits the heater module between a power supply unit and a ground when switched on, and thus, controls the heater module to be operated; and
   a data erasing device which supplies voltage or current to the heater module and permanently erases the data stored in the memory cell,
   wherein the switch module is a timer switch configured to control a data erasing time such that the timer switch is automatically turned off with a lapse of a predetermined time,
   wherein the timer switch is further configured to selectively control an operation time of the timer switch at multiple levels including a first level, a second level, and a third level, such that the timer switch causes the heater module to (1) erase, at the first level, a first percentage of the data stored in the memory cell that is less than the entirety of the data stored in the memory cell, (2) erase, at the second level, a second percentage of the data stored in the memory cell that is greater than the first percentage of the data and less than the entirety of the data, and (3) erase, at the third level, the entirety of the data, and
   wherein the data erasing device comprises a power supply module which supplies power to the memory chip, and a timer module capable of controlling a time period for supplying a power provided to the memory chip.

2. The thermal hardware-based data security device of claim 1, further comprising a first wiring line which electrically connects the power supply unit and the heater module or the switch module, and a second wiring line which electrically connects the ground and the heater module or the switch module.

3. The thermal hardware-based data security device of claim 1, wherein the memory chip is a flash memory chip which comprises a solid-state drive (SSD), a universal serial bus (USB), a secure digital (SD) card, and a transistor such as a floating gate transistor, or a charge trap layer transistor.

4. The thermal hardware-based data security device of claim 3, wherein the memory chip is comprised in a phase change memory (PcRAM), a resistive switching random access memory (RRAM), a magnetic random access memory (MRAM), or a polymer random access memory (PoRAM).

5. The thermal hardware-based data security device of claim 1, wherein the data erasing device further comprises a determination unit for determining by an operation of the heater module in a switching-on state whether the data stored in the memory cell is erased or not.

6. The thermal hardware-based data security device of claim 5, wherein, when the determination unit determines that the data stored in the memory cell has been erased, the determination unit controls dummy data to be additionally overwritten in the memory cell.

7. The thermal hardware-based data security device of claim 5, wherein the data erasing device further comprises a display for displaying the result of the determination, by the determination unit, of whether or not the data stored in the memory cell is erased.

8. The thermal hardware-based data security device of claim 1,
   wherein the memory chip, the heater module, and the switch module are comprised in one security memory,
   wherein the thermal hardware-based data security device comprises a plurality of the security memories,
   and wherein the timer module assigns independently a time period for supplying the power to each of the plurality of security memories such that the data stored in each of the plurality of security memories is individually erased.

9. The thermal hardware-based data security device of claim 1, wherein the heater module is formed of passive elements, or is formed of metal, inorganic materials, organic materials, ceramic materials, or polymer materials, and has a heat generation characteristic due to the input of an electrical signal.

10. The thermal hardware-based data security device of claim 9, wherein the passive element is one of a carbon film resistor, a solid resistor, a metal film resistor, a metal oxide film resistor, a metal glaze resistor, a fuse type resistor, a coil-type resistor, a coil-type non-inductive resistor, a cement resistor, a metal clad resistor, a ceramic resistor, a chip resistor, a network resistor, and a variable resistor.

11. The thermal hardware-based data security device of claim 9, wherein the heater module is formed of a metallic material comprising a nichrome wire or tungsten or is formed of a thermoelectric device or a positive temperature coefficient (PTC) thermistor.

12. The thermal hardware-based data security device of claim 1, wherein the heater module has a heat generation characteristic due to microwaves, ultrasonic waves, heat, radio waves, electromagnetic waves, laser, ultraviolet rays, gas, liquid, vibration which are applied externally, wireless signals supplied from a wireless power transmission device, or a magnetic field.

13. The thermal hardware-based data security device of claim 1, wherein the memory chip, the heater module, and the switch module are configured in the form of System On Chip.

14. The thermal hardware-based data security device of claim 1, wherein the data erasing device comprises a connection port which connects a plurality of the memory chips to each other to permanently erase the data stored in the plurality of memory chips.

15. A thermal hardware-based security method comprising:
   providing a memory chip comprising a memory cell in which data has been stored; and
   providing heat, through a heater module, to permanently erase the data stored in the memory cell,
   wherein the providing heat comprises
      controlling the heater module to be operated by short-circuiting the heater module between a power supply unit and a ground when a switch module is switched on,
      controlling, by the switch module which is a timer switch, a data erasing time such that the timer switch is automatically turned off with a lapse of a predetermined time,
      erasing permanently, through a data erasing device, the data stored in the memory cell by supplying voltage or current to the heater module,
      controlling, by a timer module of the data erasing device, a time period for supplying a power provided to the memory chip, and
      selectively controlling an operation time of the timer switch at multiple levels including a first level, a second level, and a third level, by causing the heater module to (1) erase, at the first level, a first percentage of the data stored in the memory cell that is less than the entirety of the data stored in the memory cell, (2) erase, at the second level, a second percentage of the data stored in the memory cell that is greater than the first percentage of the data and less than the entirety of the data, and (3) erase, at the third level, the entirety of the data.

* * * * *